US010564710B2

(12) United States Patent
Takahashi et al.

(10) Patent No.: US 10,564,710 B2
(45) Date of Patent: Feb. 18, 2020

(54) AV SIGNAL OUTPUT DEVICE, AV SIGNAL INPUT DEVICE, AND AV SIGNAL INPUT/OUTPUT SYSTEM

(71) Applicant: Panasonic Intellectual Property Management Co., Ltd., Osaka (JP)

(72) Inventors: Satoshi Takahashi, Osaka (JP); Naoshi Usuki, Kyoto (JP); Toshiroh Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/100,600

(22) Filed: Aug. 10, 2018

(65) Prior Publication Data

US 2018/0348852 A1    Dec. 6, 2018

Related U.S. Application Data

(63) Continuation of application No. PCT/JP2017/005058, filed on Feb. 13, 2017.

(30) Foreign Application Priority Data

Feb. 16, 2016    (JP) .................................. 2016-026929

(51) Int. Cl.
*H04B 10/00*    (2013.01)
*G06F 3/00*    (2006.01)
(Continued)

(52) U.S. Cl.
CPC .............. *G06F 3/005* (2013.01); *H04B 10/80* (2013.01); *H04N 21/436* (2013.01); *H04N 21/442* (2013.01)

(58) Field of Classification Search
CPC combination set(s) only.
See application file for complete search history.

(56) References Cited

U.S. PATENT DOCUMENTS 7,548,675 B2 *   6/2009   Tatum .................. G02B 6/4246
                                                    385/100
7,729,618 B2 *   6/2010   Tatum .................... G06F 13/28
                                                    398/138

(Continued)

FOREIGN PATENT DOCUMENTS

GB        2331680 A      5/1999
JP     H11-187023 A      7/1999

OTHER PUBLICATIONS

M. Sakai et al., "Asymmetric Bi-Directional Optical Fiber Module for High-Definition Video Transmission," Consumer Electronics 2008, Digest of Technical Papers, International Conference on IEEE, Jan. 9, 2008, pp. 1-2.

(Continued)

*Primary Examiner* — Agustin Bello
(74) *Attorney, Agent, or Firm* — McDermott Will & Emery LLP

(57) ABSTRACT

An AV signal input/output system includes an AV signal output device, an AV signal input device, and a cable which connects between the devices. The AV signal output device includes an existing interface, an optical interface, a selection output controller which selects existing interface differential signals or optical output signals, and outputs an AV signal, and an information identification unit which reads out information of the connected destination of a connector through existing interface signal lines. The information identification unit includes an optical information identification unit which identifies optical information. The AV signal input device includes an existing interface, an optical interface, a selection input controller which selects existing (Continued)

interface differential signals or optical input signals, and outputs an AV signal, and information storage which causes a connector to read out information through existing interface signal lines. The information storage includes optical information storage.

20 Claims, 4 Drawing Sheets

(51) Int. Cl.
*H04N 21/436* (2011.01)
*H04N 21/442* (2011.01)
*H04B 10/80* (2013.01)

(56) References Cited

U.S. PATENT DOCUMENTS

| | | | | |
|---|---|---|---|---|
| 8,340,529 B2* | 12/2012 | Shastri | ............... | G09G 5/006 398/141 |
| 2006/0067690 A1* | 3/2006 | Tatum | ............... | G02B 6/4246 398/66 |
| 2006/0077778 A1* | 4/2006 | Tatum | ............... | G02B 6/4246 369/44.11 |
| 2007/0058976 A1* | 3/2007 | Tatum | ............... | G02B 6/4201 398/99 |
| 2007/0233906 A1* | 10/2007 | Tatum | ............... | G06F 13/28 710/26 |
| 2008/0232209 A1* | 9/2008 | Vergoossen | ............ | H04N 7/163 369/47.5 |
| 2010/0131782 A1* | 5/2010 | Higuchi | ............... | H04N 5/77 713/310 |
| 2011/0162030 A1* | 6/2011 | Doi | ............... | G02B 6/4469 725/127 |
| 2011/0208963 A1* | 8/2011 | Soffer | ............... | G06F 3/023 713/168 |
| 2011/0316962 A1* | 12/2011 | Doi | ............... | H04N 21/43635 348/14.01 |
| 2012/0072896 A1* | 3/2012 | Watanabe | ............... | H04N 7/163 717/170 |
| 2012/0079473 A1* | 3/2012 | Watanabe | ............... | G06F 8/65 717/170 |
| 2013/0133021 A1* | 5/2013 | Mukaide | ............... | H04N 5/765 725/141 |
| 2013/0183045 A1* | 7/2013 | Niiho | ............... | G02B 6/28 398/142 |
| 2014/0244880 A1* | 8/2014 | Soffer | ............... | G06F 3/0227 710/300 |
| 2016/0203343 A1* | 7/2016 | Soffer | ............... | G06F 13/102 726/34 |
| 2018/0348852 A1* | 12/2018 | Takahashi | ............... | G06F 3/00 |

OTHER PUBLICATIONS

Extended European Search Report issued in Application No. 17753105.0 dated Oct. 22, 2018.
High-Definition Multimedia Interface Specification Version 1.3a, Nov. 10, 2006 [Online]. Available at: https://www.hdmi.org/manufacturer/specification.aspx.
International Search Report issued in Application No. PCT/JP2017/005058 dated May 16, 2017, with English translation.

* cited by examiner

AV SIGNAL OUTPUT DEVICE, AV SIGNAL INPUT DEVICE, AND AV SIGNAL INPUT/OUTPUT SYSTEM

CROSS REFERENCE TO RELATED APPLICATIONS

This application is a U.S. continuation application of PCT International Patent Application Number PCT/JP2017/005058 filed on Feb. 13, 2017, claiming the benefit of priority of Japanese Patent Application Number 2016-026929 filed on Feb. 16, 2016, the entire contents of which are hereby incorporated by reference.

BACKGROUND

1. Technical Field

The present disclosure relates to transmission of optical signals in parallel with electrical signals through, for instance, an existing electrical signal transmission path which complies with the high-definition multimedia interface (HDMI (registered trademark)) standard, and to inter-dependent control of existing transmission of electrical signals and optical transmission.

2. Description of the Related Art

Image transmission standards such as the high-definition multimedia interface (HDMI (registered trademark)) are technology relating to high-definition digital video/audio interfaces, and this technology is widely used in transmission of high-definition digital video/audio signals. For instance, as described in HDMI Specification Ver:1.3a [Online]. Available at: http://www.hdmi.org/manufacturer/specification.aspx (Accessed: 11 Dec. 2015), the HDMI (registered trademark) standard specifies a transmission method with a metal wire, and even if applied versions of the standard are different, a connection can be made through information recorded in a receiving display data channel (DDC). Because of such high compatibility, the HDMI (registered trademark) standard is widely used for various purposes.

In the present disclosure, a metal wire interface complying with the image transmission standards such as the HDMI (registered trademark) may be described as an "existing interface."

SUMMARY

Sometimes existing metal wire interface is not suitable for a long cable or for high-volume information transmission clue to the properties of a metal wire transmission path. Although optical transmission may be used as described in Japanese Unexamined Patent Application Publication No. 11-187023, there is the problem that compatibility with an existing interface is completely lost. In the case of using only an optical transmission path, there is another problem that power cannot be supplied.

The present disclosure has been made in view of the above problems, and has an objective to add an optical transmission path while an existing interface system is used as before, to transmit a greater amount of information while maintaining compatibility with the existing interface.

An AV signal output device according to the present disclosure includes: first communications signal lines; a first connector having an optical transmission path for transmitting first optical output signals; a selection output controller which receives an AV signal as input, and selects and outputs first differential signals or the first optical output signals; and an information identification unit which reads out information of the connected destination of the first connector through the first communications signal lines, in which the information identification unit includes an optical information identification unit which identifies optical information, the AV signal output device supplies or receives power through the first communications signal lines, and the selection output controller makes a decision using the optical information of the information identification unit and controls output.

Moreover, an AV signal input device according to the present disclosure includes: second communications signal lines; a second connector and an interface having an optical transmission path for transmitting second optical input signals; a selection input controller which selects and inputs second differential signals or the second optical input signals, and outputs an AV signal; and information storage which outputs interface information to the second connector through the second communications signal lines, in which power is supplied or received through the second communications signal lines, and the information storage includes optical information storage.

An AV signal input/output, system according to the present disclosure includes: the AV signal output device; and an interface cable which connects between the first connector and the second connector, in which the first differential signal lines and the second differential signal lines are connected through the cable, the first communications signal lines and the second communications signal lines are connected through the cable, and the first optical transmission paths and the second optical transmission paths are connected through the cable.

According to the present disclosure, power is supplied while maintaining compatibility with an existing interface. Whether an optical connection can be made is determined using optical information transmitted and received by the existing interface, and an optical connection is made accordingly. Thus, a shortage of information in the existing interface can be met.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Hereinafter, an exemplary embodiment will be described in detail with reference to the Drawings. It should be noted that too much detailed explanations may be omitted. A detailed explanation for well-known matters and repeated explanations for essentially the same configuration may be for instance omitted. This is to avoid needlessly long explanations and to allow those skilled in the art to facilitate their understanding.

Embodiment 1

Hereinafter, Embodiment 1 will be described with reference to FIG. 1.

[1. Configuration]

Figure 1:
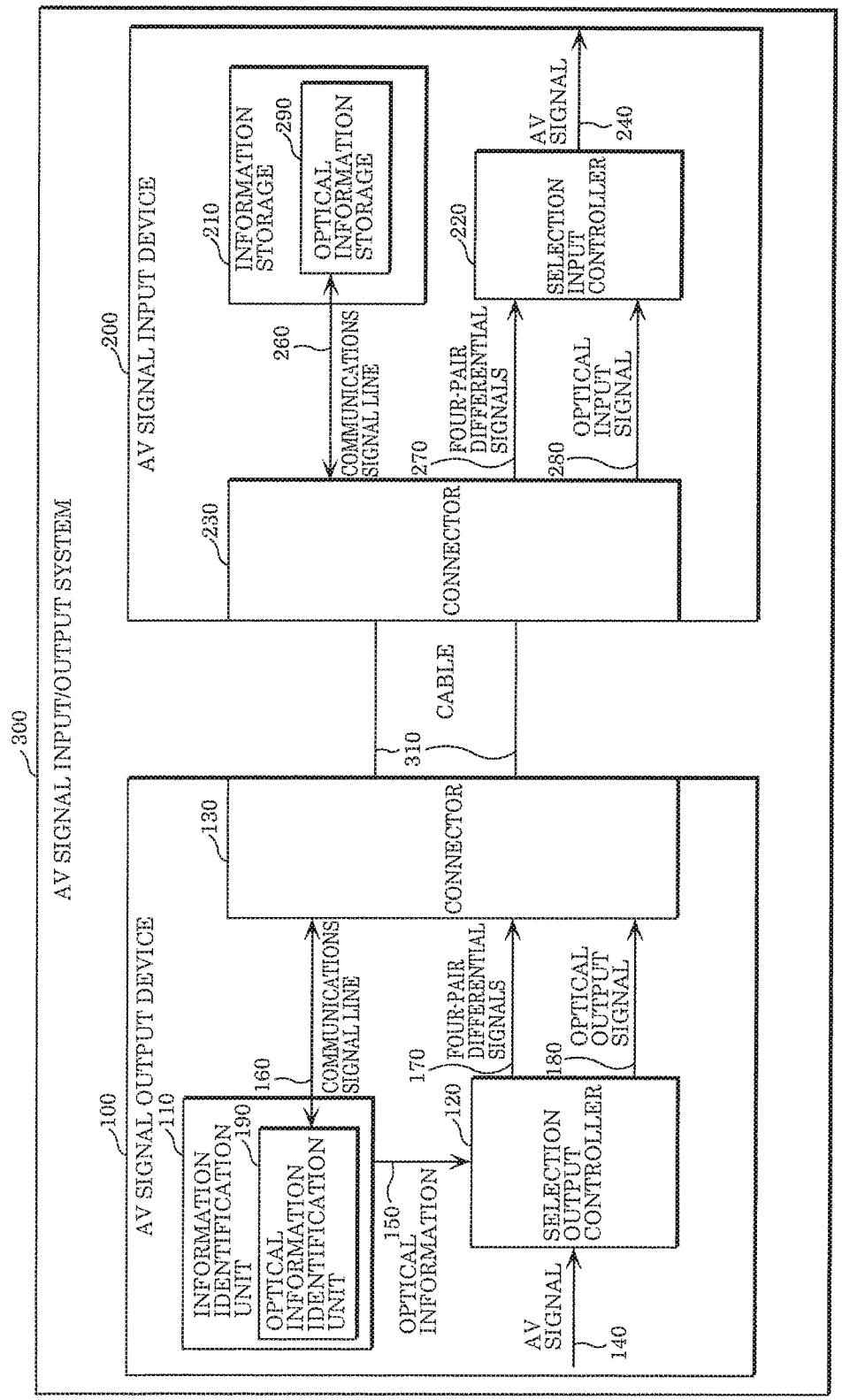
FIG. 1 is a block diagram illustrating the configuration of an AV signal input/output system in Embodiment 1.

FIG. 1 is a block diagram illustrating an AV signal input/output system according to Embodiment 1. In AV signal input/output system 300, AV signal output device 100 and AV signal input device 200 are connected.

AV signal output device 100 reads out information of a connected destination, determines whether or not to make an optical connection, and outputs an AV signal in accordance with the determined result. AV signal output device 100 includes information identification unit 110, selection output controller 120, connector 130, communications signal lines 160, signal lines for transmitting differential signals 170, and al lines for transmitting optical output signals 180. These signal lines connect between information identification unit 110, selection output controller 120, and connector 130.

Four-pair differential signals 170 are transmitted from selection output controller 120 to connector 130. Communications signal lines 160 connect information identification unit 110 and connector 130. Power is also supplied and received through communications signal lines 160. Optical output signals 180 are transmitted from selection output controller 120 to connector 130. Connector 130 includes an optical transmission path for transmitting optical output signals 180.

Information identification unit 110 reads out information of the connected destination of connector 130 through communications signal lines 160. Information identification unit 110 further includes optical information identification unit 190 for identifying optical information from the information of the connected destination.

Selection output controller 120 receives optical information 150 from optical information identification unit 190, selectively controls output, and outputs inputted AV signal 140. That is, selection output controller 120 switches between existing differential signals 170 and optical output signals 180.

AV signal input device 200 changes output signals on the basis of an input signal from the connected destination. AV signal input device 200 includes information storage 210, selection input controller 220, connector 230, communications signal lines 260, signal lines for transmitting differential signals 270, and signal lines for transmitting optical input signals 280. These signal lines connect between information storage 210, selection input controller 220, and connector 230.

Four-pair differential signals 270 are inputted from connector 230 to selection input controller 220. The signal lines for transmitting differential signals 270 may be existing interfaces. Communications signal lines 260, which connect information storage 210 and connector 230, may be existing interfaces. Power is also supplied and received through communications signal lines 260. Optical input signals 280 are inputted from connector 230 to selection input controller 220. Connector 230 includes an optical transmission path for transmitting optical input signals 280.

Information storage 210 outputs information to connector 230 through communications signal lines 260. Information storage 210 includes optical information storage 290. Optical information storage 290 stores information (optical information) indicating whether an optical connection with AV signal input device 200 can be made or not.

Selection input controller 220 selectively switches between differential signals 270 and optical input signals 280 on the basis of the status of an input signal (AV signal transmitted from the connected destination), and outputs AV signal 240.

AV signal input/output system 300 includes cable 310 which connects between connector 130 of AV signal output device 100 and connector 230 of AV signal input device 200. Connections between the signal lines for four-pair differential signals 170 and the signal lines for four-pair differential signals 270 are made through cable 310. Connections between communications signal lines 160 and communications signal lines 260 are made through cable 310. A connection between the optical transmission path of connector 130 and the optical transmission path of connector 230 is made through cable 310.

Cable 310 includes both a signal line complying with the HDMI (registered trademark) standard and an optical signal line.

When cable 310 is connected, a decision is made on optical information through communications using the signal lines for differential signals 170, the signal lines for differential signals 270, communications signal lines 160, and communications signal lines 260. When optical information identification unit 110 determines to make an optical connection, optical signal communication is conducted through the transmission path for transmitting optical output signals 180. When optical information identification unit 110 determines not to make an optical connection, existing differential signals 170 are outputted. Differential signals 170 or optical output signals 180 are outputted from AV signal output device 100 as AV signal 140. Outputted AV signal 140 is inputted to AV signal input device 200, and is outputted as AV signal 240. As such, smooth switching between the existing differential signals and the optical signals is made possible.

This prevents the missing of data when cable 310, which is a transmission path, is long, and provides a system appropriate for high-volume transmission and high-speed transmission.

It should be noted that existing communications signal lines 160, existing communications signal lines 260, the existing signal lines for four-pair differential signals 170, and the existing signal lines for four-pair differential signals 270 (hereinafter these signal lines are together referred to as an existing interface) maintain compatibility with a communications line such as a DDC line in the HDMI (registered trademark) and signal lines for transmitting four-pair differential signals. For instance, these signal lines are the same as signal lines in the HDMI (registered trademark). Thus, even if AV signal output device 100 and AV signal input device 200 are connected only by the existing interface, and the optical transmission paths are not connected, communication can be established as long as compatibility with the existing interface is maintained.

In AV signal input/output system 300, the optical transmission paths are also connected. That is, AV signal input/output system 300 is a hybrid system in which optical communication can also be conducted. The existing interface, which is the HDMI (registered trademark), and an optical transmission path coexist, and switching between the existing interface and the optical transmission path is achieved through existing interface communications. After completion of a protocol for connecting with an interface compatible with the HDMI (registered trademark), a connection can be made using optical information 150.

The existing interface is a metal wire such as a copper wire. A glass fiber or a resin fiber is for instance used for making the optical signal line.

[2. Operation]

Hereinafter, the operations of AV signal input/output system 300 including AV signal output device 100 and AV signal input device 200, which have the above configuration, will be described.

When an AV signal is outputted from AV signal output device 100, cable 310 is connected to connector 130 of AV signal output device 100 and to connector 230 of AV signal input device 200. This enables connections between the signal lines for four-pair differential signals 170 and the signal lines for four-pair differential signals 270, connections between communications signal lines 160 and communications signal lines 260, and a connection between the optical transmission paths.

When AV signal output device 100 is connected to AV signal input device 200 through cable 310, the connection with AV signal input device 200 is detected by the connection detection signal line of communications signal lines 160. When the connection is detected, the information communications line of communications signal lines 160 and communications signal lines 260 reads out information from information storage 210 of AV signal input device 200 to information identification unit 110.

AV signal output device 100 reads out information stored in optical information storage 290 of information storage 210 of AV signal input device 200 to optical information identification unit 190 of information identification unit 110. Optical information storage 290 stores information on optical capability indicating whether optical signals can be received. The information of optical information storage 290 is read out to optical information identification unit 190 through the existing interface. The readout information is sent to selection output controller 120 as optical information 150. This enables to determine whether an optical connection with AV signal input device 200 can be made or not.

Selection output controller 120 determines whether an optical connection can be made or not, on the basis of optical information 150. When determining that optical information 150 indicates that optical signals can be received, selection output controller 120 selects to use optical output signals 180 and changes the output. When determining that optical information 150 does not indicate that optical signals can be received, selection output controller 120 selects to use four-pair differential signals 170 and starts outputting the signals. That is, when determining that an optical connection can be made, selection output controller 120 selects optical output signals 180 as a means of communication. However, when determining that an optical connection cannot be made, selection output controller 120 selects four-pair differential signals 170 as a means of communication.

Through the above operations, switching between the optical transmission paths and the existing interface signal lines for the four-pair differential signals can be easily performed on the basis of the information of optical information storage 290 of AV signal input device 200. Moreover, power can be supplied or received by using communications signal lines 160 and communications signal lines 260, which are parts of the existing interface, (Variation 1 of Embodiment 1)

Figure 2:
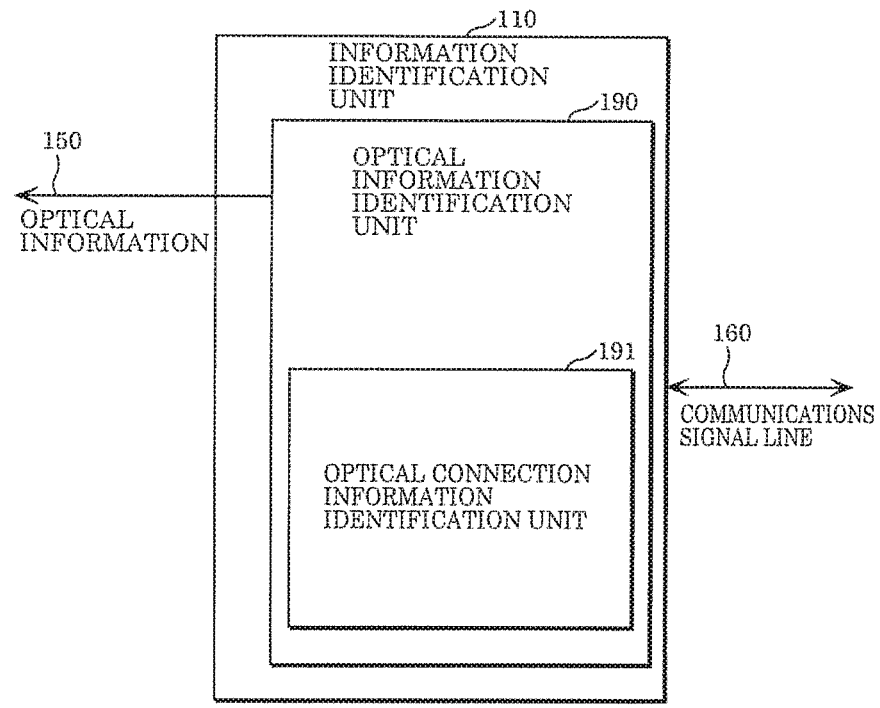
FIG. 2 is a block diagram illustrating the configuration of an information identification unit in Variation 1 of Embodiment 1.
Figure 3:
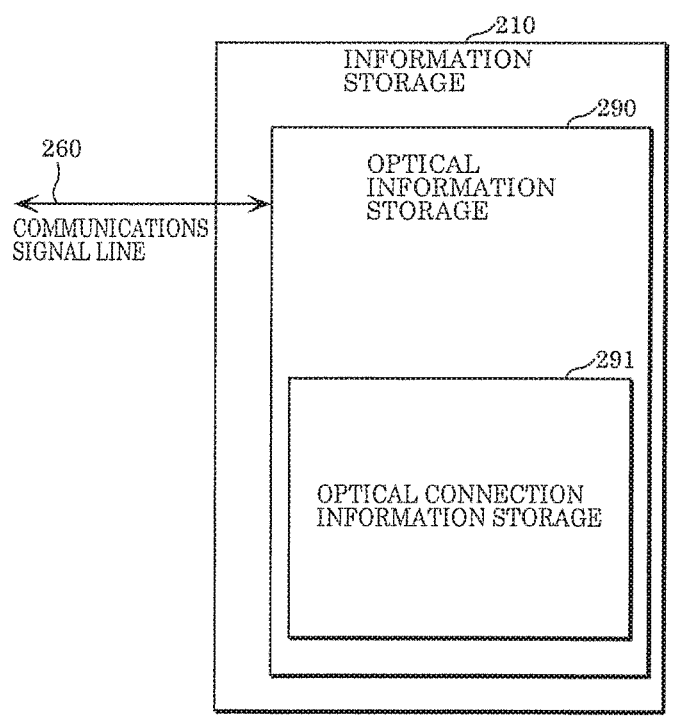
FIG. 3 is a block diagram illustrating the configuration of information storage in Variation 1 of Embodiment 1.

Hereinafter, Variation 1 of Embodiment 1 will be described with reference to FIGS. 2 and 3. FIG. 2 is a block diagram in which optical information identification unit 190 includes optical connection information identification unit 191 in AV signal output device 100. FIG. 3 is a block diagram in which optical information storage 290 includes optical connection information storage 291 in AV signal input device 200.

When optical signals are actually inputted to selection input controller 220 in AV signal input device 200, optical connection information storage 291 stores optical connection information. This allows optical connection information identification unit 191 in AV signal output, device 100 to check the actual optical connection with AV signal input device 200. For instance, when optical connection information identification unit 191 determines that an optical connection is being made, and outputs optical information 150 to selection output controller 120, optical output signals 180 will be continuously used. Meanwhile, when optical connection information identification unit 191 determines that an optical connection is not being made, and outputs optical information 150 to selection output controller 120, selection output controller 120 switches from optical output signals 180 to four-pair differential signals 170. Such flexible control based on the connection is made possible.

Hereinafter, operations will be described. When optical information storage 290 includes optical connection information storage 291 in AV signal input device 200, optical connection information storage 291 stores a result obtained by selection input controller 220 determining whether optical input signals 280 are being inputted.

Optical connection information identification unit 191 identifies and retrieves the information indicating whether the optical input signals are being inputted, which is stored in optical connection information storage 291, and outputs the information as optical information 150.

Optical information 150 may include only the information on whether optical signals can be received, stored in optical information storage 290. Alternatively, optical information 150 may also include the information on whether optical input signals are being inputted, stored in optical connection information storage 291.

Selection output controller 120 makes a comprehensive decision from these pieces of information, and determines whether to output signals through the optical transmission path or to output signals through the existing differential signal interface.

Variation 2 of Embodiment 1

Hereinafter, Variation 2 of Embodiment 1 will be described with reference to FIGS. 4 and 5.

Figure 4:
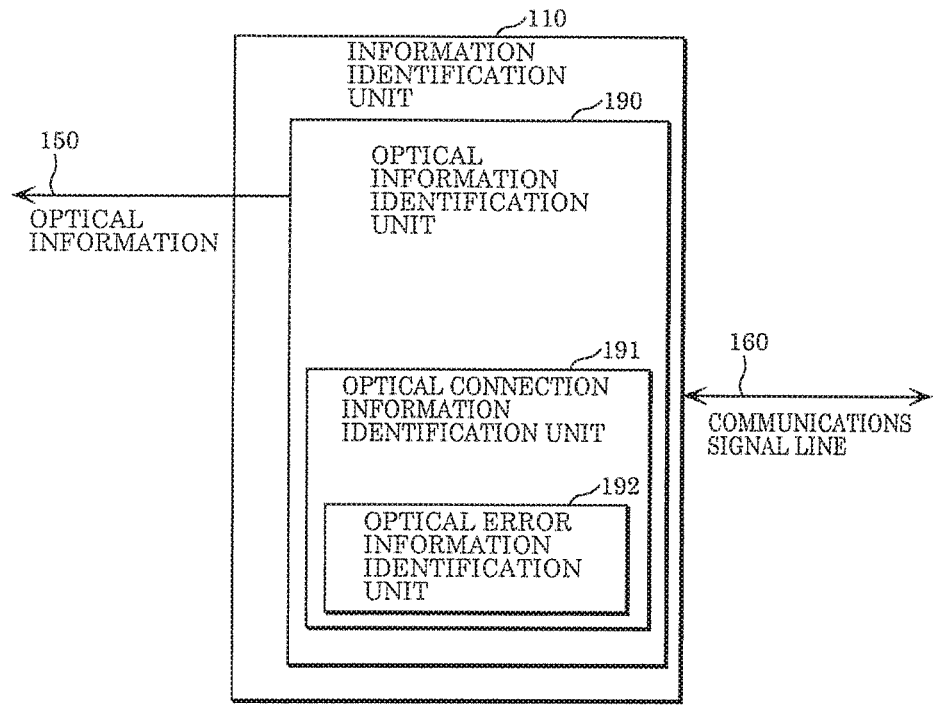
FIG. 4 is a block diagram illustrating the configuration of an information identification unit in Variation 2 of Embodiment 1.
Figure 5:
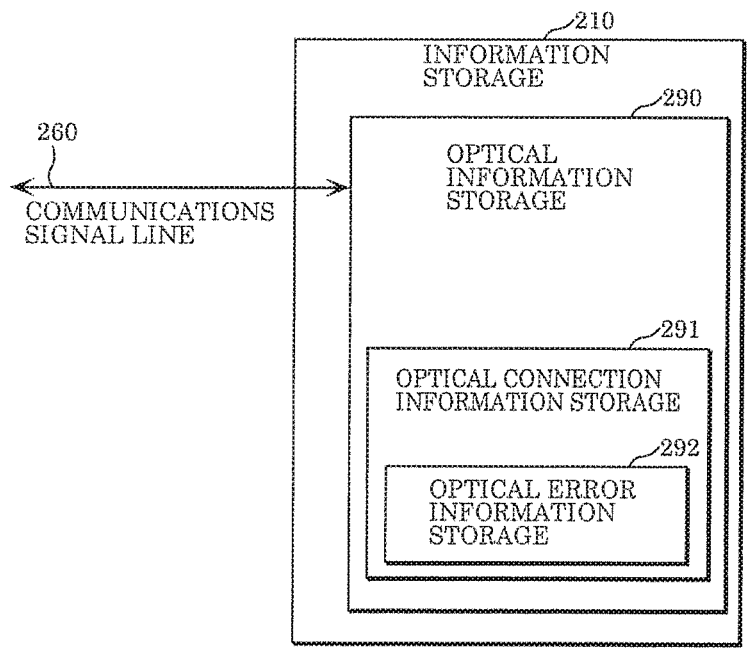
FIG. 5 is a block diagram illustrating e configuration of information storage in Variation 2 of Embodiment 1.

FIG. 4 is a block diagram in which the configuration of Variation 1 further includes optical error information identification unit 192 in optical connection information identification unit 191. FIG. 5 is a block diagram in which the configuration of Variation 1 further includes optical error condition storage 292 in optical connection information storage 291.

There is a case in which although selection input controller 220 in AV signal input device 200 is actually optically connected, a transmission band cannot be sufficiently ensured due to, for instance, the dirt of the optical transmission path. In such case, optical error information storage 292 stores information indicating the error detection of data. This allows optical error information identification unit 192 in AV signal output device 100 to check an optical error condition. For instance, when optical error information identification unit 192 determines that there is no particular problem in the optical error condition, and outputs optical information 150 to selection output controller 120, optical output signals 180 will be continuously used. However, when optical error information identification unit 192 determines that an optical error is large and that a problem will arise in an optical connection, the signals will be switched to four-pair differential signals 170. Such flexible control based on the optical error condition is made possible.

Hereinafter, operations will be described. When selection input controller 220 has the function of detecting an optical error, optical error information storage 292 stores retrieved optical error information.

Optical error information identification unit 192 identifies and retrieves the error information stored in optical error information storage 292, and outputs the information as optical information 150.

Optical information 150 may include only the information on whether the optical signals can be received, stored in optical information storage 290. Alternatively, optical information 150 may also include the information on whether the optical input signals are being inputted, stored in optical connection information storage 291. Optical information 150 may also include the optical error information stored in optical error information storage 292.

Selection output controller 120 makes a comprehensive decision from these pieces of information, and determines whether to output signals through the optical transmission path or to output signals through the existing differential signal interface.

Variation 3 of Embodiment 1

Hereinafter, Variation 3 of Embodiment 1 will be described with reference to FIG. 6.

Figure 6:
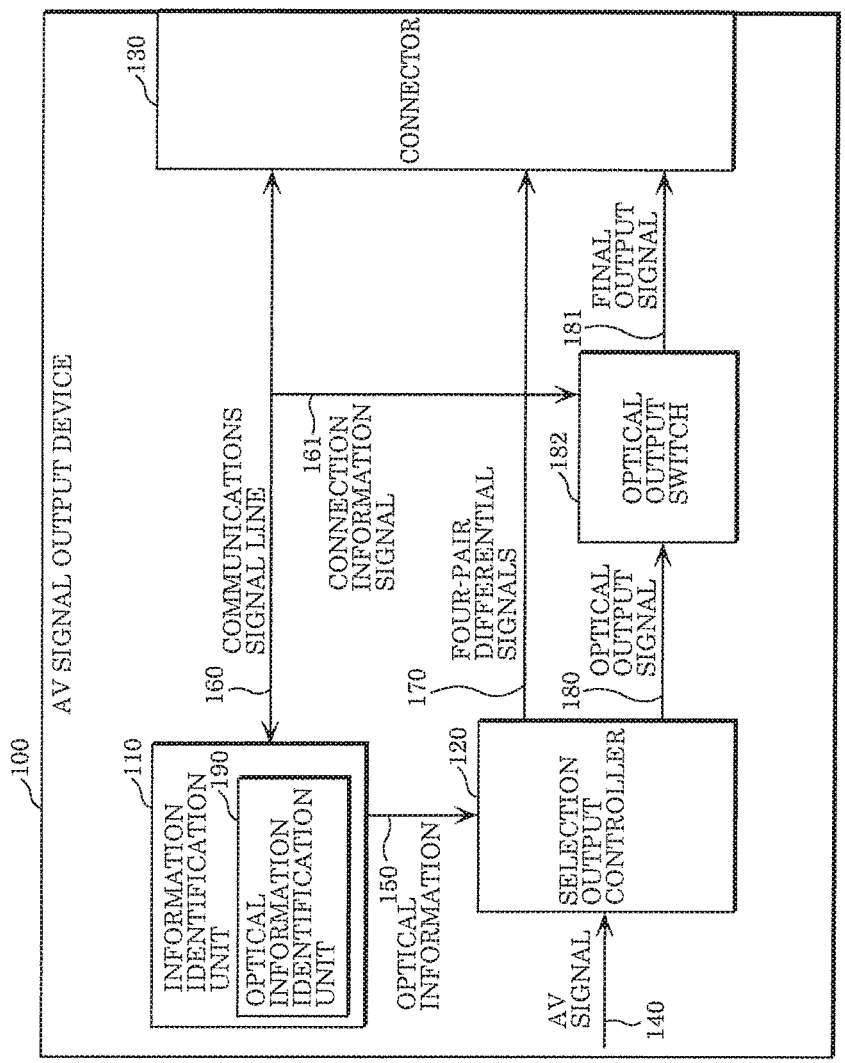
FIG. 6 is a block diagram illustrating the configuration of an AV signal output device in Variation 3 of Embodiment 1.

FIG. 6 is a block diagram in which AV signal output device 100 in Embodiment 1 further includes optical output switch 182, a signal line for transmitting connection information signal 161, and a signal line for transmitting final output signal 181. The signal line for transmitting connection information signal 160 is one of communication signals 160, which are existing interfaces.

AV signal output device 100 includes communications signal lines 160, which are existing interfaces, and a signal which detects a successful connection with the AV signal input device may be transmitted and received between communications signal lines 160. For instance, a connection detection signal referred to as HPD in the HDMI (registered trademark) is equivalent to the signal.

In this variation, optical output is turned on or off with optical output switch 182, by using connection information signal 161 which detects the connection, such as an HPD signal in the HDMI (registered trademark). It is possible to fabricate a device capable of operating in the following manner. When it is determined that the connection destination is connected, optical output can be performed by turning on optical output switch 182. When it is determined that the connection destination is not connected, optical output will not be performed by turning off optical output switch 182.

For this configuration, if the cable comes off, the disconnection of the cable can be immediately detected, and optical output can be controlled on the basis of whether the connection destination is connected. That is, it is possible to avoid an error that optical output is performed when the connection destination is not connected.

As above, Embodiment 1 and the variations thereof are described as examples of the art disclosed in the present application. However, the art in the present disclosure is not limited thereto, and is also applicable to an embodiment in which changes, replacement, addition, omission, or other modifications have been made thereto where appropriate. Moreover, a new embodiment can be made by combining the components described in Embodiment 1 and the variations thereof.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An AV signal output device, an AV signal input device, and an AV signal input/output system according to the present invention are advantageous in the following points. Power can be supplied as before while compatibility with an existing interface is maintained. A shortage of information is met by additionally using optical signals. A greater amount of information than that of the existing interface is managed.

What is claimed is:

1. An AV signal output device, comprising:
first communications signal lines;
a first connector having an optical transmission path for transmitting first optical output signals;
a selection output controller which receives an AV signal as input, and selects and outputs first differential signals or the first optical output signals; and
an information identification unit configured to read out information of a connected destination of the first connector through the first communications signal lines,
wherein the information identification unit includes an optical information identification unit which identifies optical information from the information read out from the connected destination,
the selection output controller makes a decision using the optical information of the information identification unit and controls output, and
the AV signal output device supplies or receives power through the first communications signal lines.

2. The AV signal output device according to claim 1, wherein the optical information indicates whether optical communication with the connected destination of the first connector can be conducted.

3. The AV signal output device according to claim 1, wherein the optical information of the connected destination of the first connector includes optical connection information indicating successful reception of optical signals by the connected destination of the first connector.

4. The AV signal output device according to claim 3, wherein the optical connection information includes error information as optical connection status of the connected destination of the first connector.

5. The AV signal output device according to claim 3, wherein the optical information identification unit outputs optical information identified using both the optical information and the optical connection information.

6. The AV signal output device according to claim 1, wherein signal lines for transmitting the first differential signals and the first communications signal lines are metal wires.

7. The AV signal output device according to claim 1, further comprising:
a signal line through which a connection information signal for detecting a successful connection is transmitted, the signal line being included in the first communications signal lines; and
an optical output switch which receives the optical output signals as input, and outputs a final output signal using the connection information signal,
wherein the optical output switch turns on or off output in accordance with the connection information signal.

8. The AV signal output device according to claim 1, wherein the first differential signals and signals transmitted through the first communications signal lines are input/output signals employed in HDMI (registered trademark) standard.

9. The AV signal output device according to claim 7, wherein the connection information signal is an HPD signal in HDMI (registered trademark) standard.

10. An AV signal input device, comprising:
the AV signal output device according to claim 1;
second communications signal lines;
a second connector having an optical transmission path for transmitting second optical input signals;
a selection input controller which selects second differential signals or the second optical input signals, and outputs an AV signal; and
information storage which outputs information to the second connector through the second communications signal lines,
wherein power is supplied or received through the second communications signal lines, and
the information storage includes optical information storage.

11. The AV signal input device according to claim 10, wherein information of the optical information storage includes optical information indicating whether optical communication with the AV signal input device can be conducted.

12. The AV signal input device according to claim 10, wherein information of the optical information storage includes optical connection information indicating successful reception of optical signals by the AV signal input device.

13. The AV signal input device according to claim 12, wherein the optical connection information includes error information as optical connection status of the AV signal input device.

14. The AV signal input device according to claim 12, wherein the selection input controller determines to use either the second differential signals or the second optical input signals in accordance with the optical connection information, and controls input.

15. The AV signal input device according to claim 10, wherein signal lines for transmitting the second differential signals and the second communications signal lines are metal wires.

16. The AV signal input device according to claim 10, wherein the second differential signals and signals transmitted through the second communications signal lines are input/output signals employed in HDMI (registered trademark) standard.

17. The AV signal input device according to claim 10, wherein the information storage is EDID.

18. An AV signal input/output system, comprising:
the AV signal output device according to claim 1;
an AV signal input device, including:
second communications signal lines;
a second connector having an optical transmission path for transmitting second optical input signals;
a selection input controller which selects second differential signals or the second optical input signals, and outputs an AV signal; and
information storage which outputs information to the second connector through the second communications signal lines,
wherein power is supplied or received through the second communications signal lines, and
the information storage includes optical information storage; and
a cable which connects between the first connector and the second connector,
wherein the first differential signal lines and the second differential signal lines are connected through the cable,
the first communications signal lines and the second communications signal lines are connected through the cable, and
the first optical transmission paths and the second optical transmission paths are connected through the cable.

19. The AV signal input/output system according to claim 18, wherein the cable has both a signal line complying with HDMI (registered trademark) standard and an optical signal line.

20. The AV signal input/output system according to claim 18, wherein when the cable is connected, the first differential signal lines and the second differential signal lines are connected, and the first communications signal lines and the second communications signal lines are connected, and subsequently, the information identification unit makes a decision about the optical information, and the first optical transmission paths and the second optical transmission paths are connected accordingly.

* * * * *